United States Patent
Kra et al.

(10) Patent No.: US 7,492,825 B2
(45) Date of Patent: Feb. 17, 2009

(54) METHODS AND APPARATUSES FOR PROCESSING DATA CHANNELS

(75) Inventors: Yehuda Kra, Modiin (IL); Yuval Berger, Kfar Vitkin (IL); Moshe De-Leon, Kiriat Ono (IL); Barak Perlman, Rechovot (IL)

(73) Assignee: Siverge Networks Ltd, Herzliya (IL)

( * ) Notice: Subject to any disclaimer, the term of this patent is extended or adjusted under 35 U.S.C. 154(b) by 280 days.

(21) Appl. No.: 11/490,941

(22) Filed: Jul. 21, 2006

(65) Prior Publication Data
US 2007/0067610 A1 Mar. 22, 2007

Related U.S. Application Data

(60) Provisional application No. 60/709,273, filed on Aug. 17, 2005.

(51) Int. Cl.
*H04N 7/12* (2006.01)
*G06F 11/00* (2006.01)
(52) U.S. Cl. .................... 375/240.26; 714/5
(58) Field of Classification Search ........... 375/240.26; 341/51, 67; 711/162; 714/5; 382/291; 348/700
See application file for complete search history.

(56) References Cited

U.S. PATENT DOCUMENTS

| | | | | |
|---|---|---|---|---|
| 5,829,046 A | * | 10/1998 | Tzelnic et al. | 711/162 |
| 5,835,035 A | * | 11/1998 | Bakhmutsky | 341/67 |
| 5,933,603 A | * | 8/1999 | Vahalia et al. | 709/225 |
| 6,557,113 B1 | * | 4/2003 | Wallentine et al. | 714/5 |

* cited by examiner

*Primary Examiner*—Gims S Philippe
(74) *Attorney, Agent, or Firm*—Thomas Van Zandt

(57) ABSTRACT

A system and method for processing an extremely high data rate datastream. Embodiments of the invention provide methods for performing various operations on the datastream in order to map the datastream from one protocol to another as well as providing methods for processing multiple channels of a given protocol. For one embodiment of the invention a portion of a datastream is received to a stream buffer. A data stream window is then created from the received portion, the data stream window containing data of more than one protocol. A corresponding portion of the data of a same protocol, is accessed through each of a plurality of processing machines. The accessed data is concurrently processed at each of the processing machines.

15 Claims, 10 Drawing Sheets

Figure #1
Configurable bit stream access

Figure #2
Multi-Channel Configurable access Structure

Figure #3
Data Stream Manipulation

Figure #4
Multi Channel Buffering Memory Structure

Figure #5
Application Example

METHODS AND APPARATUSES FOR PROCESSING DATA CHANNELS

CLAIM OF PRIORITY

This application claims priority from U.S. Provisional Patent Application No. 60/709,273, entitled "Methods and Apparatuses for Processing Data Channels", filed on Aug. 17, 2005, which is hereby incorporated by reference in its entirety.

FIELD

Embodiments of the invention relate generally to the field of integrated circuits (ICs) for processing data channels and more specifically to ICs that share processing resources among multiple data channels.

BACKGROUND

There are many types of applications (e.g., communications) for which it is desirable to process a high number of high speed signals on a single circuit. For example, components of communication infrastructure typically require the processing of transferred data at a performance capable of supporting the maximum defined data rate. Such data processing may include protocol dependent functionality such as synchronization, data detection, field extraction, field construction, data processing, data formatting, and hierarchical manipulation. Additionally in many cases the communication component interfaces between multiple channels connected to multiple infrastructures with similar or totally different conventions.

For example, many high speed communications signals such as Plesiochronous Digital Hierarchy (PDH) or Synchronous Optical Network (SONET) signals include a multiple sub-channels and data links. Such communication signals may include high priority system messages between various pieces of communication switching equipment, such as high-level datalink control (HDLC) formatted messages. Such signals may also include high priority messages known as BOM messages (bit oriented messages) which may contain a 1 byte abort signal and a 1 byte code message. DS3 or T3 signals typically include 28 DS1 or 28 T1 sub-channels, respectively, and therefore require the processing of 28 individual sub-channels. This presents the problem of how to process these multiple signals. The use of multiple ICs, each capable of processing a single channel may be impractical due to space, power consumption, and cost constraints.

Providing high-speed signal processing for multiple channels (or even for a single channel processing multiple protocols) can dramatically reduce the overall cost of such applications. Some advances have been made in this area. For example, communications equipment manufacturers have attempted to achieve higher density processing of communications signals. Higher density processing allows more high-speed communication signals to be processed on a circuit board or chip of a given cost than was previously possible.

In general, in designing an integrated solution, the various considerations that need to be addressed include the total bandwidth requirements, the number of channels to be concurrently supported, and the number and complexity of protocols supported. In addition, interoperability, scalability, and costs are also factors in the design process.

Conventional implementation of an integrated solution for multiple channel processing has severe disadvantages. Typically, an IC for multi-channel processing integrates multiple repeated instantiations of sub-components each handling one specific channel carrying one specific protocol. Additionally, each sub-component processes its data channel by sequentially processing data grains, either received or generated, one at a time. For conventional systems a data grain is typically a single bit, or a group of, at most, a few bits. Such an approach is inefficient for large scale multi-channel and multiple protocol, high bandwidth, applications. The inefficiency is due to the massive redundancy in logic and physical resources for each channel and for similar functions of the different protocols. Moreover, within a single channel carrying a specific protocol, independent data processing is performed sequentially. This results in a scalability barrier making typical solutions impractical for applications requiring multi-channel, multiple protocol, high bandwidth data processing.

SUMMARY

For one embodiment of the invention a portion of a datastream (e.g., bitstream) is received to a stream buffer. A data stream window is then created from the received portion, the data stream window containing data of more than one protocol. A corresponding portion of the data of a same protocol, is accessed through each of a plurality of processing machines. The accessed data is concurrently processed at each of the processing machines.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide an IC solution for multi-channel processing that allows resource sharing in processing multiple channels carrying multiple protocols with a high level of flexibility for sharing resources allocated only where needed and thereby providing a cost effective practical solution. For one such embodiment of the invention a large portion of processing is performed in parallel to increase efficiency. One embodiment of the invention is implemented as an IC architecture that processes multiple channels using a datastream manipulation configurable structure. All channels share the structure to efficiently accomplish processing tasks. For one such embodiment of the invention, when processing a specific channel, the structure concurrently processes multiple portions within a segment of the datastream using parallel processing.

Embodiments of the invention provide systems and methods for processing an extremely high data rate datastream. Embodiments of the invention provide methods for performing various operations on the datastream in order to map the datastream from one protocol to another as well as providing methods for processing multiple channels of a given protocol.

For one embodiment of the invention the datastream is input to a datastream window where specific data is captured and forwarded to one of a number of parallel processing devices for processing. For one embodiment of the invention such processing may include synchronization, analysis, field extraction, data manipulation, and output datastream construction.

Alternative embodiments of the invention implement or effect some or all of channel buffering, memory access partitioning, multi-port channel data access, hierarchical data processing and channel frame synchronization.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
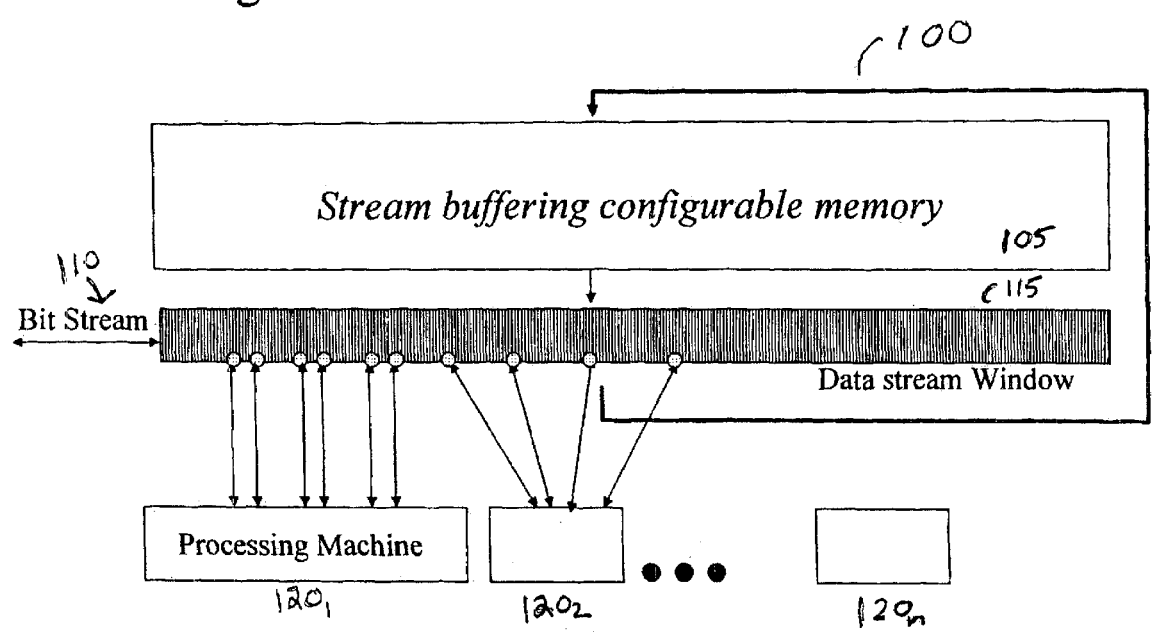
FIG. 1 illustrates a circuit architecture for concurrently processing data from a single datastream in accordance with one embodiment of the invention.

FIG. 1 illustrates a circuit architecture for concurrently processing data from a single datastream in accordance with one embodiment of the invention. As shown in FIG. 1, architecture 100 includes a memory 105 for buffering a datastream 110 and providing a data stream window 115. The data stream window 115 allows one or more of several channel processing machines $120_1$-$120_n$ to maintain access to some amount of continuous data of the incoming or outgoing data stream per channel. The channel processing machines perform the processing. Each time a channel processing is resumed, a channel processing machine is loaded with the saved context. Each time processing is suspended the context is saved into a context storage until processing is resumed. As new portions of datastream 110 (i.e., new data) arrive a window context of a specific channel is scheduled to be fetched. When the window context is fetched, the captured data within the data stream window 115 is shifted to insert the newly arrived data, thus displacing the previous data in the data stream window (i.e., the less recently arrived data is dropped). The processing machines $120_1$-$120_n$ access different or shared points in the data stream window concurrently. Each of the processing machines $120_1$-$120_n$ can concurrently process multiple portions of the time-shifted data of the data stream window 115.

Figure 2:
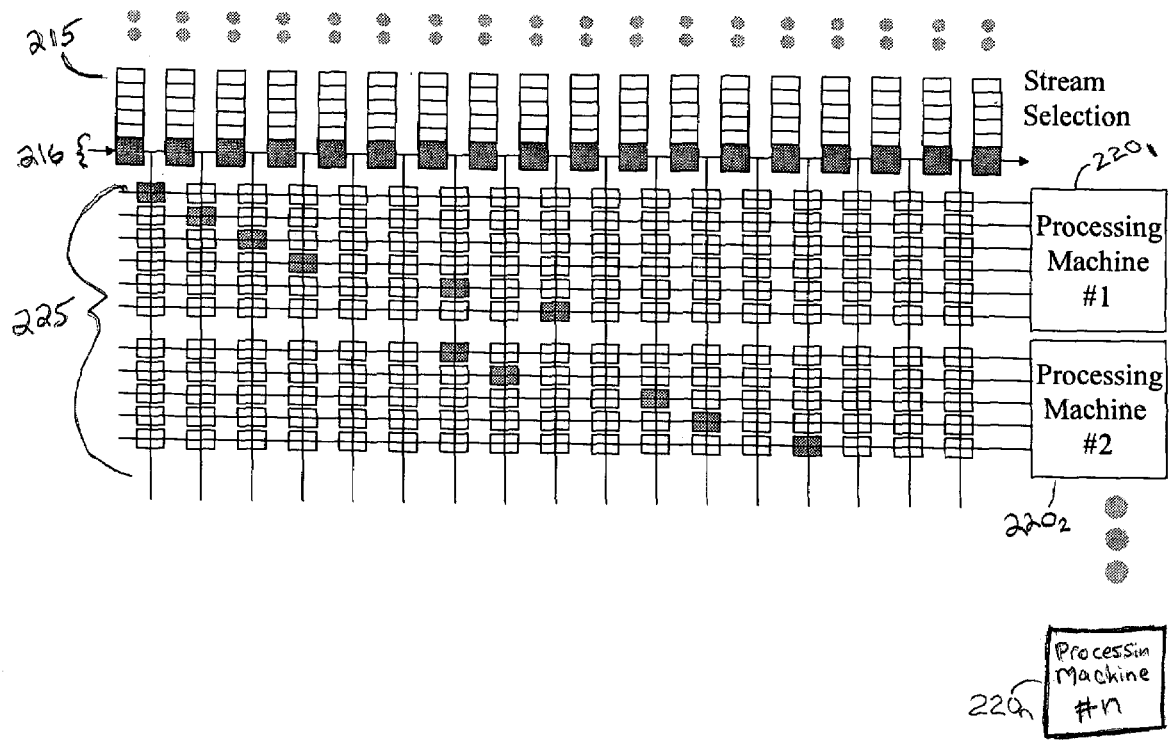
FIG. 2 illustrates a multi-channel configurable access structure in accordance with one embodiment of the invention.

FIG. 2 illustrates a multi-channel configurable access structure in accordance with one embodiment of the invention. As shown in FIG. 2, the data stream window 216 loaded with one channel at a time is connected to an access matrix 225. The access matrix 225 includes configurable access points to selected data within the data stream window 216. The data stream window 216 selected data is connected through the access matrix 225 to the processing machines $220_1$-$220_n$ that may analyze, manipulate or generate the channel streamed data. Channel stream context is selected from the multiple channels residing in 215. Thus the available processing machines $220_1$-$220_n$, are efficiently shared and utilized among all the channels of a multiple channel system in accordance with one embodiment of the invention.

Figure 3:
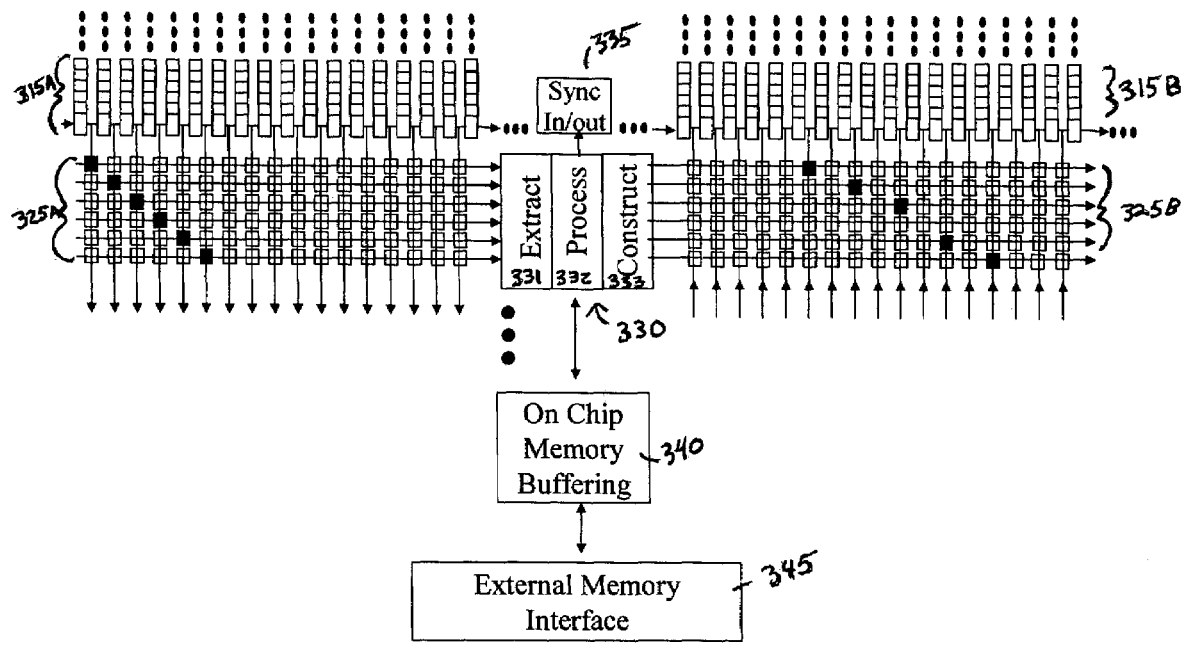
FIG. 3 illustrates a system in which a datastream is manipulated in accordance with one embodiment of the invention.

In accordance with alternative embodiments of the invention a full datastream manipulation path can be constructed. FIG. 3 illustrates a system in which a datastream manipulation path is constructed in accordance with one embodiment of the invention. System 300, shown in FIG. 3 includes a multi channel input data stream window 315A providing an input access matrix 325A. The datastream manipulation functionality 330 consists of one or more processing machines and manipulates the input data including applying an extraction function 331, a processing function 332, and a construction process 333. The synchronization function 335 synchronizes the input data stream window 315a and the output data stream window 315B. The output access matrix 325B determines the output data stream multi channel window 315B. IC internal and external memory can be provided through on chip memory buffering 340 and external memory interface 345 where data buffering storage is required.

One embodiment of the invention comprises a system providing a multi-channel context switching functionality that switches context at the rate of the total input or output bandwidth. That is, data stream windows, corresponding to specific channels, can be switched at a rate corresponding to the ultra high bandwidth of the communications system employed.

Figure 4:
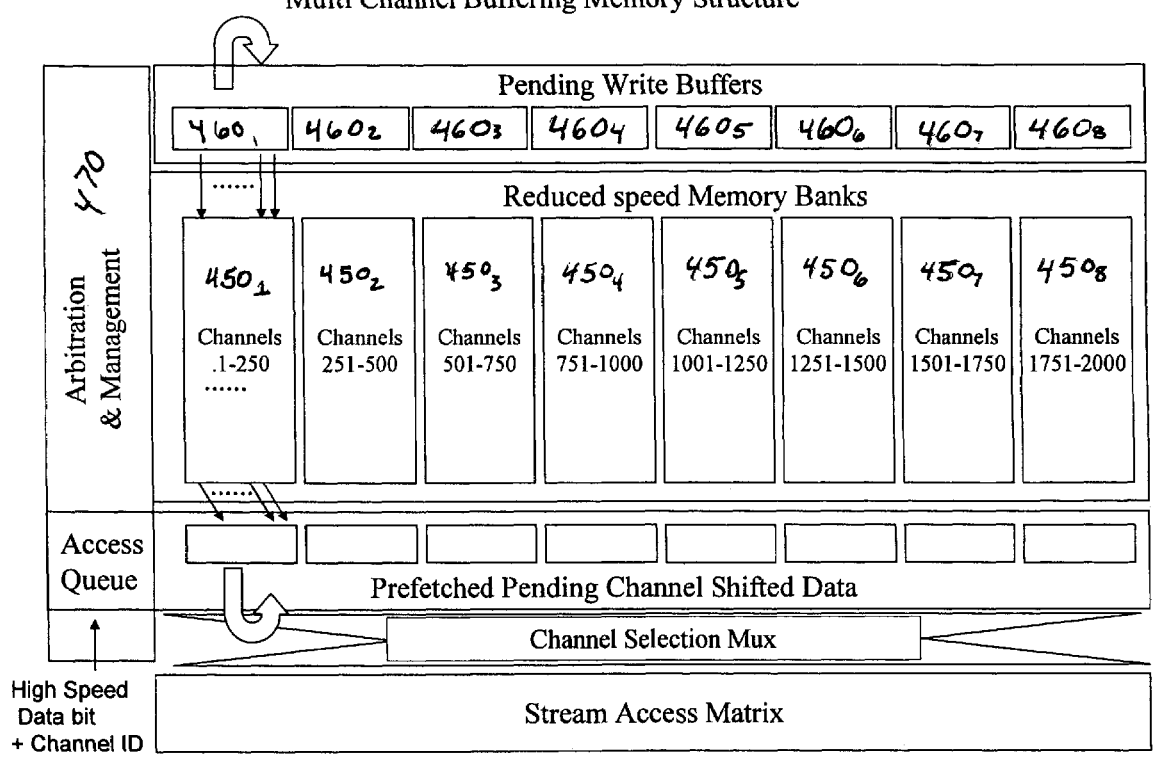
FIG. 4 illustrates a buffering system having a context switching rate corresponding to a desired ultra high bandwidth in accordance with one embodiment of the invention.

FIG. 4 illustrates a system having a context switching rate corresponding to a desired ultra high bandwidth in accordance with one embodiment of the invention. As shown in FIG. 4, the channels are therefore partitioned into multiple memory banks, shown for example as memory banks $450_1$-$450_8$. Each memory bank $450_1$-$450_8$ can operate at a significantly reduced speed corresponding to the total bandwidth requirement divided by the number of memory banks $450_1$-$450_8$. The data arriving from the multiple channels is queued in corresponding write buffers $460_1$-$460_8$ until the specific channel is fetched by the buffer scheduling management logic 470.

Figure 5:
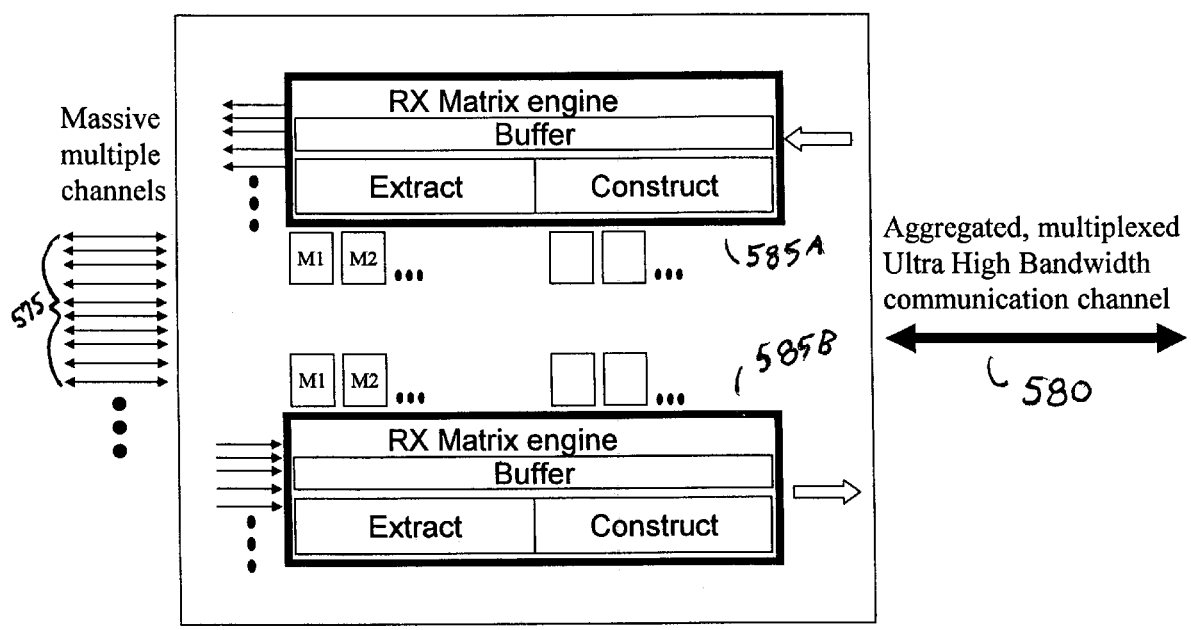
FIG. 5 illustrates a multi-channel data transfer system as applied to a communication data in accordance with one embodiment of the invention.

FIG. 5 illustrates a multi-channel data transfer system as applied to communication data in accordance with one embodiment of the invention. An embodiment of the invention may be applied to a communication system as shown in FIG. 5. System 500, shown in FIG. 5, connects multiple independent channels 575 into one single multiplexed ultra high bandwidth channel 580. Each of the channels 575 may be carrying data of different formats and protocols that needs to be translated or mapped to the high bandwidth multiplexed channel 580. A matrix (e.g., matrix 585A and matrix 585B) is therefore instantiated in both directions allowing the transferred data stream to be efficiently extracted, processed and constructed by the shared processing machines.

Figure 6:
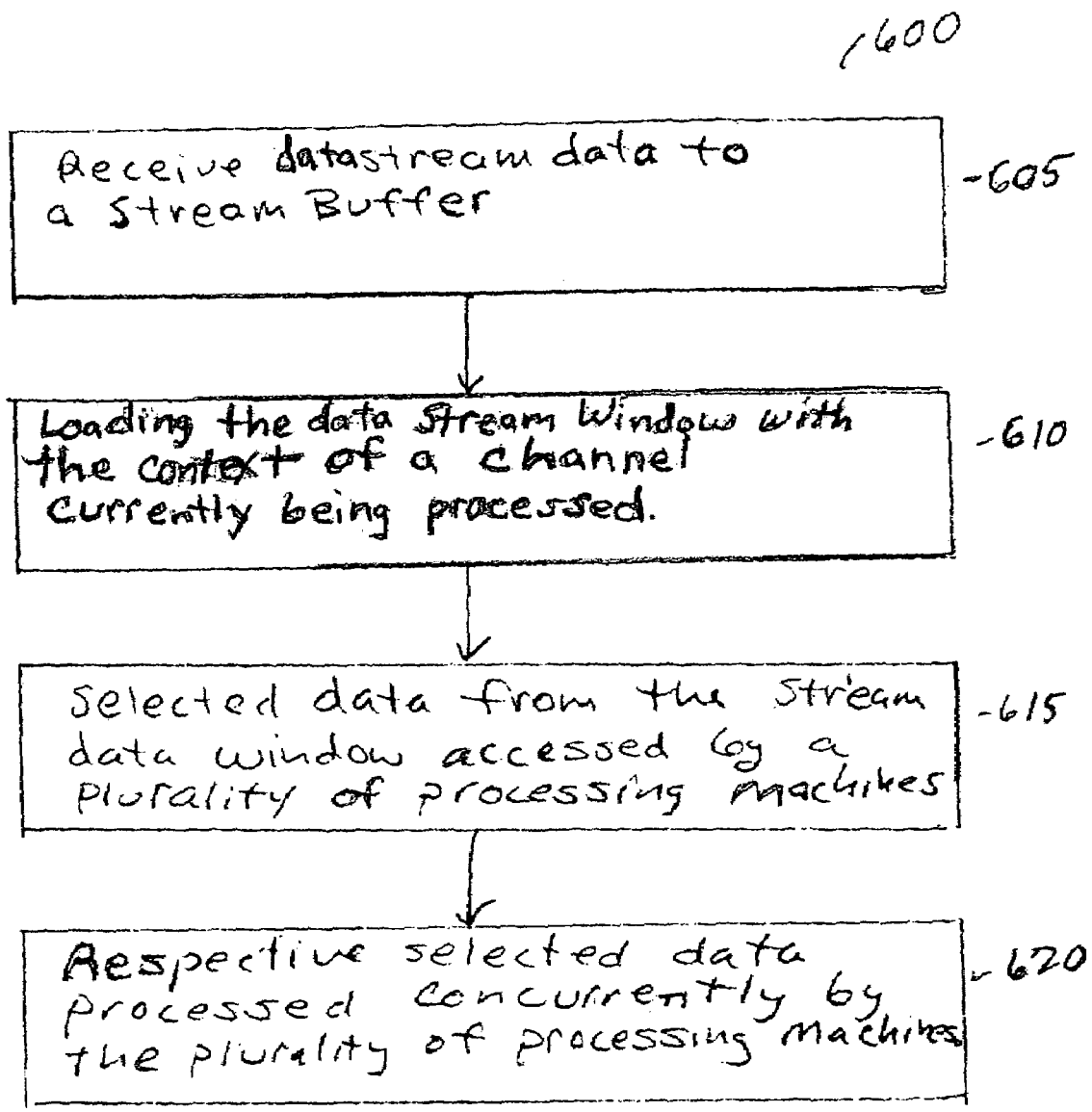
FIG. 6 illustrates a process in which portions of a datastream are concurrently processed in accordance with one embodiment of the invention.

FIG. 6 illustrates a process in which portions of a datastream are concurrently processed in accordance with one embodiment of the invention. Process 600, shown in FIG. 6, begins at operation 605 in which a portion of a datastream is received at a stream buffer.

At operation 610 a data stream window is loaded with the context of a channel currently being processed.

At operation 615 each of a plurality of processing machines accesses selected data from the data stream window. At operation 620 each of the processing machines concurrently effects desired manipulation of the respective accessed data.

EXEMPLARY EMBODIMENTS

Channel Buffering

As described above, a multi-channel context switching system in accordance with an embodiment of the invention can provide processing for hundreds or even thousands of channels. The increasing number of channels requires correspondingly frequent context switching in order to schedule every event (e.g., the arrival of a bit, byte, or frame of data) on each channel. The higher frequency of context switching consumes system resources. In accordance with one embodiment of the invention, events (e.g., the arrival of an atom of data on a channel) are buffered and the context scheduled only after the accumulation of a specified number of events per channel, thus reducing the frequency of context switching.

Figure 7:
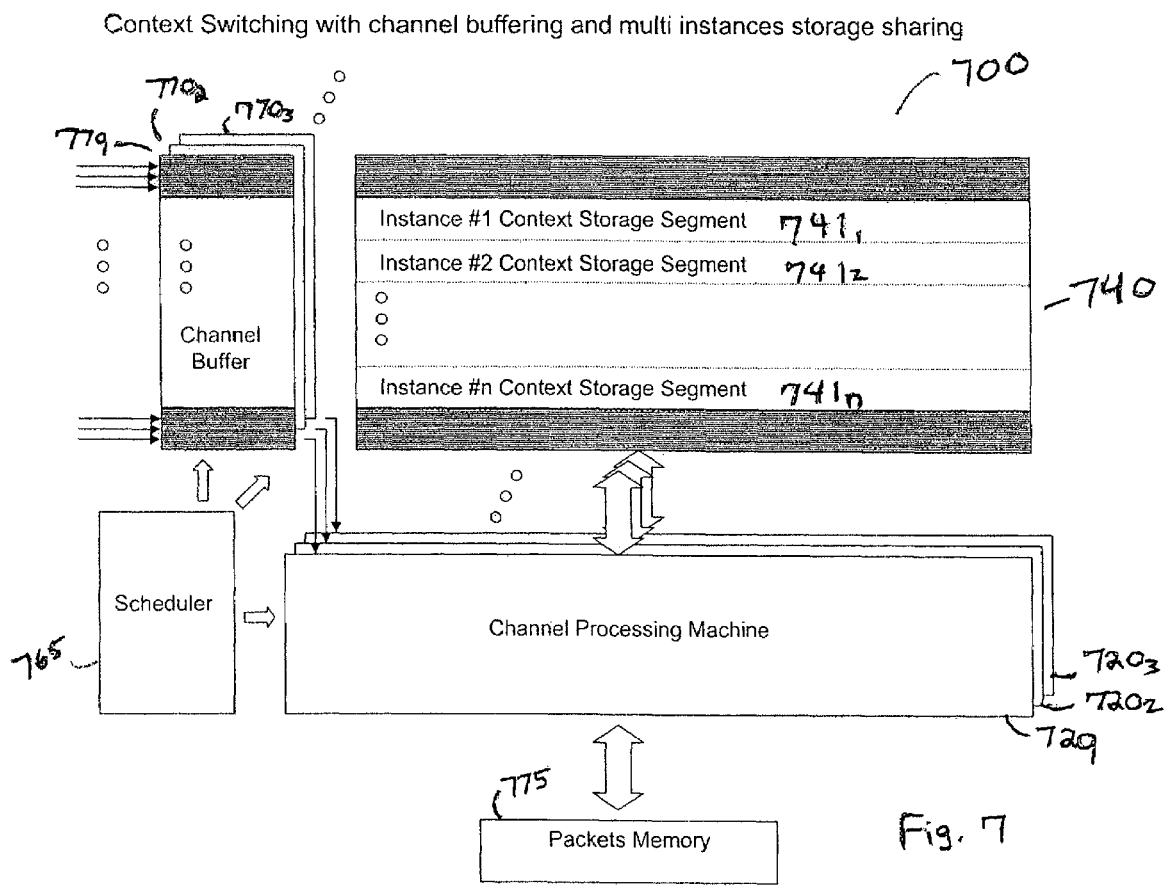
FIG. 7 illustrates a context switching system implementing channel buffering and multi-instance storage sharing in accordance with one embodiment of the invention.

FIG. 7 illustrates a context switching system implementing channel buffering and multi-instance storage sharing in accordance with one embodiment of the invention. System 700, shown in FIG. 7, includes multiple channel buffers, shown for example as channel buffers 770.sub.1-770.sub.3. In accordance with one embodiment of the invention, for each channel, multiple events for each channel are accumulated in a corresponding channel buffer. An event may comprise the arrival of an atom of data, which may be a bit, byte, or packet of data. Only when a specified number of events (e.g., a specified amount of data) are accumulated, does the scheduler 765 schedule the data to be processed. The scheduler is programmed with priorities for each channel and allocates bandwidth. When the programmed criteria of the scheduler in regard to buffered data are met for each channel, the channel processing is invoked by loading the processing machine with the context of the channel. For one embodiment of the invention, the accumulated data for each channel is processed by a channel processing machine of a plurality of machines, shown for example as channel processing machines 720.sub.1-720.sub.3. The channel processing machines perform the actual processing. Each time a channel processing is resumed, a channel processing machine is loaded with the saved context. Each time processing is suspended the context is saved into a context storage until processing is resumed. For one embodiment of the invention, the specified number of events accumulated for each channel may be dynamically determined to address changing requirements for each channel or to match the data rate of input channels with the data processing performance of the channel processing machines.

This is effected by controlling the scheduling and width of the buffer for each channel. For one embodiment of the invention the specified number of events accumulated is calculated based upon the memory resources of the system to improve utilization of the memory. This is effected by controlling the scheduling and width of the buffer.

As noted, the specified number of events accumulated (e.g., the scheduling frequency and buffer width) may be different for each channel. Such an embodiment may be implemented in a time division multiplex (TDM) based system to allocate system resources more efficiently and provide a level of quality of service. Because the amount of buffering per channel is controllable, a TDM system can be modified so that the timeslots are not equal allowing prioritizing of one TDM channel over another. That is through varying the buffer size and frequency of service high QOS channels can be maintained. Additionally, system 700 includes packets memory 775 that is used to store packet-based data for further assembly and processing. System 700 can use channel buffering to provide a desired QOS to packet-based data. That is, the system in accordance with one embodiment may interface between TDM and packet-based communication with TDM data stored as packets and packet-based data served in a TDM-like fashion.

Partitioned Memory Access

The implementation of channel buffering as described above in reference to FIG. 7, allows the system memory access to be partitioned into multiple time slots each of which serves an instance of the machine. That is, due to the implementation of the channel buffer, the memory is not accessed upon the arrival of each atom of data, but only after a specified amount of data. This frees, a corresponding amount of memory access bandwidth. As shown in FIG. 7, system 700 includes a memory 740 that is partitioned into multiple context storage segments, shown for example as context storage segments $741_1$-$741_n$. The partitioning of the memory access into time slots provides increased memory access bandwidth that allows a continuous memory structure to serve multiple instances of context switching systems each of which accesses the memory at a respective corresponding time period. Such an embodiment allows different levels of hierarchical channels (e.g., T1, T2, and T3) to be processed by different context switching mechanisms that share the same memory structure. Thus the number of ports and the amount of memory infrastructure can be reduced while increasing efficiency.

Multi-Port Shared Data Access

Context switched tasks might be required to transfer and process data from input to output ports of different uncorrelated clock domains, with no correlation in terms of the scheduling of each port. That is, because each port has its own events that determine its scheduling, there is no way to effect scheduling that satisfies both ports. Still each port needs to transfer data. In such case data sharing between the communicating tasks should be managed and protected.

Figure 8:
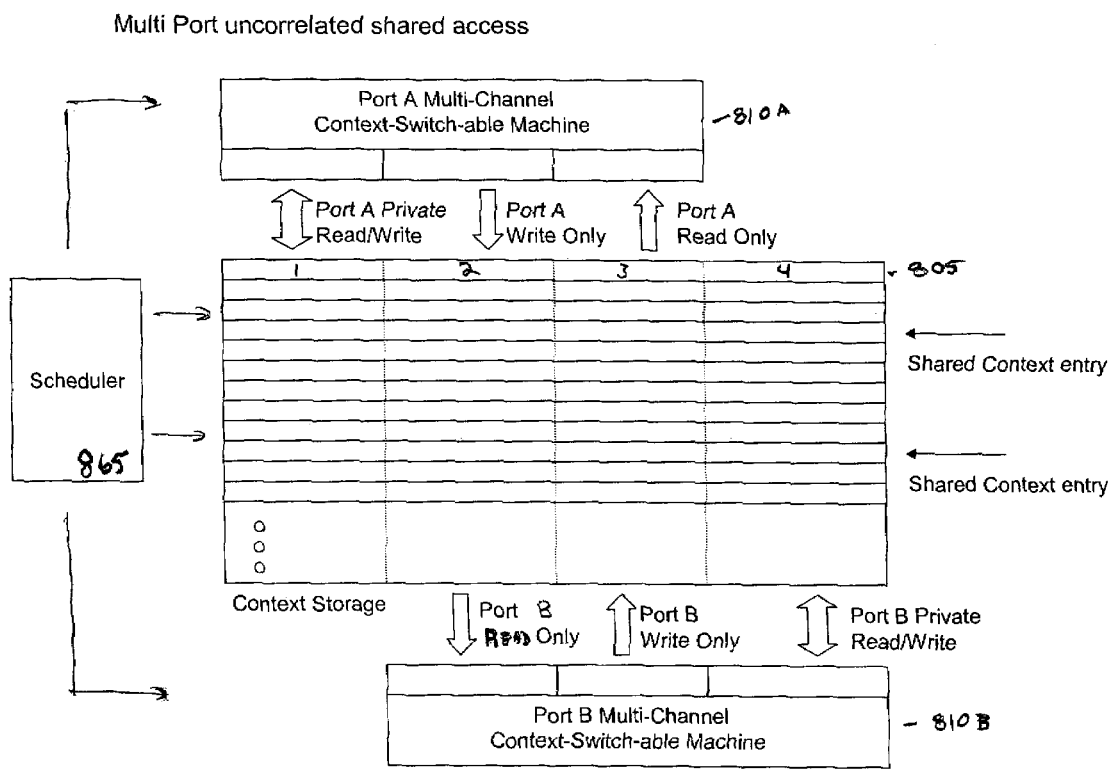
FIG. 8 illustrates a system implementing multi-port uncorrelated shared access in accordance with one embodiment of the invention.

In accordance with one embodiment of the invention, a context entry may be shared among multiple tasks. FIG. 8 illustrates a system implementing multi-port uncorrelated shared access in accordance with one embodiment of the invention. A shared context entry is used when two or more entities need to share data. As shown in FIG. 8, each shared context entry, for example shared context entry 805 is divided into four segments, two private segments each of which is accessed respectively, only by its master port, and two more regions each writable only by one side master port and readable only by the other. Thus each of the multi-channel context-switchable machines 810A and 810B cannot write to the same field, thus corrupting the data, but can communicate with one another by writing data into the shared space that only one port can write to and the other port read from. As shown in FIG. 8, section 1 of the shared context entry 805 can be read from or written to by port A, while section 4 can be read from or written to by port B. Section 2 can only be written to by port A and read from by port B, while section 3 can only be written to by port B and read from by port A. Thus the shared context entry allows data sharing between multiple entities. Scheduler 865 schedules the context switching as described above in reference to FIG. 7.

An embodiment of the invention uses a single context switching infrastructure (as opposed to multiple context switching infrastructure) to allow communication between ports having independent time domains. Thus independent and uncorrelated channel processing tasks may communicate and transfer data, one with the other, by accessing a shared memory space that is independently scheduled by multiple tasks. Though described in reference to a context-switch based multi-channel concurrent processing system, the partitioned shared context entry scheme described in reference to FIG. 8 is equally applicable to conventional context switching schemes.

Multi-Hierarchical Level Support

Many protocols, such as PDH, SONET, or Synchronous Digital Hierarchy (SDH) operate on a hierarchical basis. PDH, for example, includes a DS3 channel comprised of seven DS2 channels which in-turn are comprised of four DS1 channels. In order to process such hierarchical data, all of the subchannels of a channel must be extracted and then introduced to a separate processing machine.

Figure 9:
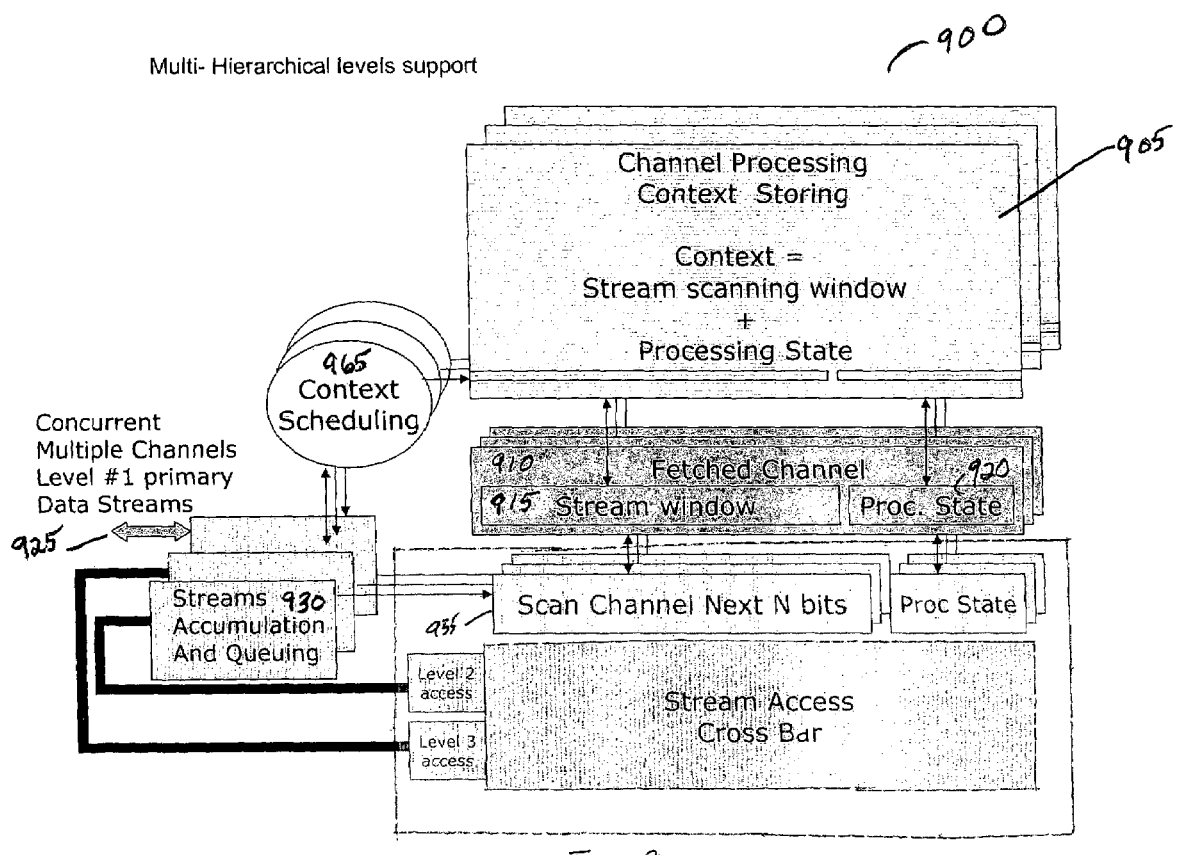
FIG. 9 illustrates a scheme for processing hierarchical-based data using a plurality of multi-channel concurrent processing systems in accordance with one embodiment of the invention.

In accordance with one embodiment of the invention, hierarchical data is efficiently processed by implementing multiple instances of a multi-channel concurrent processing system. FIG. 9 illustrates a scheme for processing hierarchical-based data using a plurality of multi-channel concurrent processing systems in accordance with one embodiment of the invention. System 900, shown in FIG. 9, includes multiple instances of a multi-channel concurrent processing system. Each instance of the machine includes a channel processing context storing function 905. The state of the machines processing a channel at a certain moment is considered as the channel processing context, by storing it in a memory we may suspend a channel processing task, free the machine resource to handle other channels, and subsequently reload the saved context to resume the channel processing. When processing handling hierarchical protocols there is a memory space allocated per hierarchy. A context is composed of a stream window 915 which the data stream is sliding through and a processing state 920 of the machines processing the channel, as captured at a certain moment. The context of the channel currently being processed is stored by the fetched channel function 910. The processing of all channels of a hierarchical level is effected through an independent scheduler 965.

As shown in FIG. 9, a primary input is received from the network to the first instance of the machine. This is shown as concurrent multiple channels primary data stream 925. The subchannels of the primary data are then extracted. For example, if the primary data is T3, then the 7 T2 channels are extracted (e.g., by creating a stream comprised of every $7^{th}$ bit of the primary data). The sub-hierarchy channels extracted out of the primary channel are processed by the second level system instance. Subsequent hierarchical levels are processed in similar fashion. The primary or extracted data stream, per hierarchy, is accumulated per channel, using accumulation and queuing function 930, during the interim when the channel is not being currently processed.

System 900 includes a next bits scan channel 935 storing the data within the stream window holding the next group of bits to be processed. System 900 also includes a stream access cross bar 940, which operates across each of the processing machines to connect the required bits within the stream to the corresponding processing machine.

Frame Synchronization

Data streams, such as TDM data streams, are often comprised of consecutive, fixed-size data frames. An initial step of processing such signals is to detect the frame alignment and synchronize the stream processing to it. This means determining where each frame starts. For some TDM and other protocols, a synchronization pattern is implemented in which the first bit in each frame for a number of successive frames comprises a pattern to allow for frame alignment detection.

Frame synchronization requires time and resources. For example, consider a datastream having 200-bit frames, with each bit having a corresponding bit slot, and 20-bit frame alignment indicators, the actual values are protocol dependent. Initially each bit within a periodic window of a frame width can be a frame alignment candidate and should be checked against the synchronization pattern, this is typically done by some state machine. The bits from a specific bit slot over a 20 frame segment of the datastream are evaluated in a pattern detection mechanism. If the frame alignment pattern is not detected, the bits from a subsequent bit slot over a 20 frame segment of the datastream are evaluated. Such method could require 800,000 bits for frame alignment detection.

In accordance with one embodiment of the invention, a context switching mechanism is applied to the bit slots of the data frame, and each of the bits of a frame is considered a context. When the bit arrives, the context of the candidate bit slot is invoked. The next bit is analyzed concurrently, without waiting for 200 bits (i.e., the number of bits in a frame). For one embodiment, the channel context is partitioned into fields one per state machine bit, each acting as a shift register, grouping the respective bits of all shift registers represents a synchronization state machine context of the respective bit slot.

Figure 10:
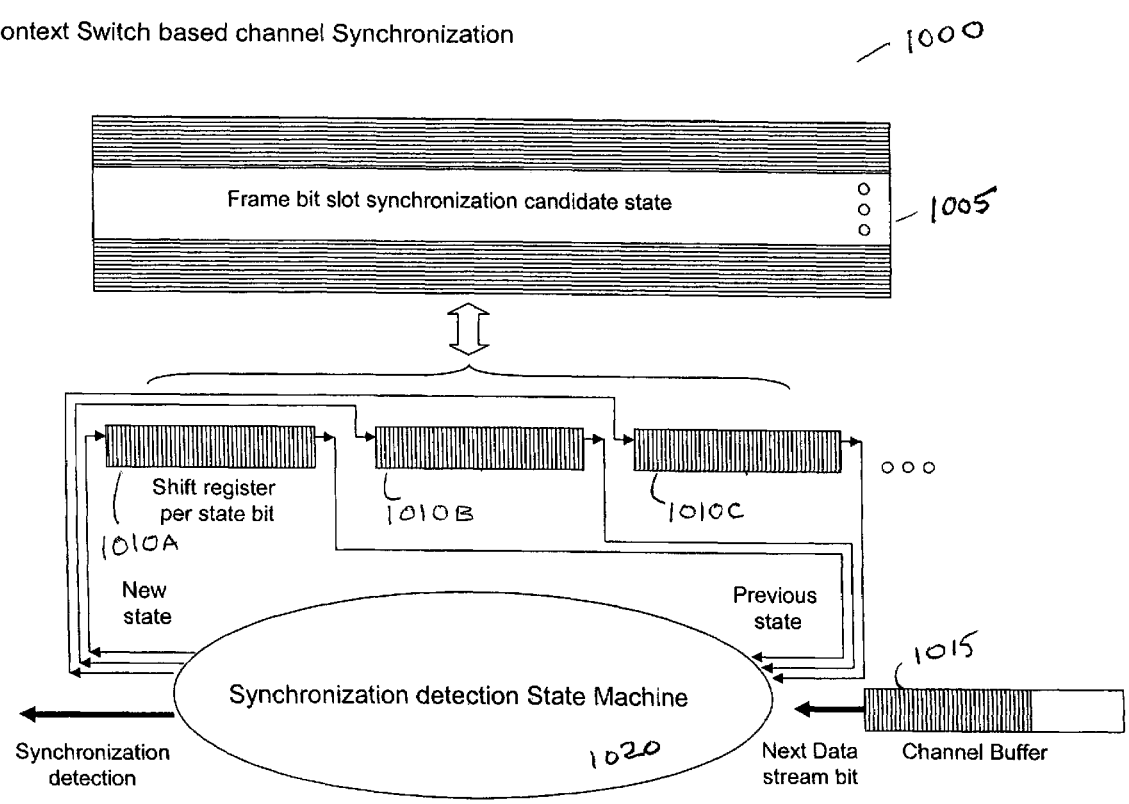
FIG. 10 illustrates a channel frame synchronization scheme employing context switching in accordance with one embodiment of the invention.

FIG. 10 illustrates a channel frame synchronization scheme employing context switching in accordance with one embodiment of the invention. System 1000, shown in FIG. 10, includes a frame slot synchronization candidate state storage 1005 in which the synchronization machine state per bit-slot within the frame is stored as a context entry within the memory. System 1000 also includes a number of cyclic shift registers, shown for example, as shift registers 1010A-1010C. The shift register are as wide as the frame size and each state bit is maintained in a shift register. The new state is calculated out of the previous state and stored into the respective bits of the state bit cyclic shift register. The state machine 1020 performs the synchronization and declares synchronization detection.

To effect frame synchronization, upon arrival of a bit from the channel buffer 1015, the next bit state machine context is fetched into the state machine 1020. The context is then processed with the arrived bit and the updated state context is stored to the shift registers 1010A-1010C.

Though described in reference to a context-switch based multi-channel concurrent processing system, the frame synchronization scheme described in reference to FIG. 10 is equally applicable to conventional context switching schemes and can be employed to provide frame synchronization for many types of TDM frame synchronization.

General Matters

Embodiments of the invention provide an IC design that allows the concurrent processing of multiple portions of a data stream by shifting the data through a data stream window. In accordance with one embodiment of the invention, the datastream window has multiple access points connecting portions of the datastream to one or more of multiple processing machines. In accordance with various embodiments of the invention the access points may be fixed, or alternatively, programmed to access any data portion within the window.

For one embodiment of the invention, the processing effected includes one or more of synchronization, analysis, field extraction, data manipulation and output stream construction.

For one embodiment of the invention multiple datastreams are processed by common shared logic. For one such embodiment, a datastream may be fetched from storage, processed, and returned to storage at any point.

In accordance with one embodiment of the invention, two or more instantiations of a multi-channel data processing system are concatenated. For one such embodiment, each instantiation may be responsible for specific data processing. For example, one multi-channel data processing system may be dedicated to stream synchronization and extraction, while another is dedicated to constructing the output data stream.

For one embodiment of the invention the processing is performed in between stages and may use internal and external memory for temporally storing data required for datastream processing.

For one embodiment of the invention a multiple stream high-rate context-switching mechanism can utilize memories of a speed which is fractional to the context switching rate, by distributing the stream storing location among multiple memories controlled by a scheduling mechanism that guarantees sufficient access time for memories' read or write operations.

For one such embodiment of the invention two instantiations of the multiple stream high-rate context-switching mechanism are implemented. Each of the two instantiations are implemented corresponding to one of two path directions of a communications system. Such a communication system may process streams of the same protocol which may be for example, T1 or HDLC or Ethernet or ATM or Frame Relay or MPLS or other protocols.

Various embodiments of the invention implement or effect some or all of channel buffering, memory access partitioning, multi-port channel data access, hierarchical data processing and channel frame synchronization.

Embodiments of the invention include various operations such as inserting, buffering, processing, and manipulating data. For various embodiments, one or more operations described may be added or deleted. The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. Embodiments of the invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

Further, though described for various embodiments in the context of a multi-channel communications system, embodiments of the invention are applicable to a variety of multi-channel data transfer systems as well as for single channel data transfer systems employing multiple data standards.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system for processing data comprising:
an integrated circuit including:
means for receiving and transmitting one or more datastreams comprising data to be processed;
a memory for buffering the one or more datastreams the buffering effected at an atomic level as small as one bit at a physical wire level of the integrated circuit;
a scheduler for scheduling processing of the data upon configured criteria being met; and
a plurality of processing machines; and means for shifting a datastream through a datastream window, the means for shifting comprising an integrated circuit hardware shifting mechanism, the datastream window having multiple access points that allow the plurality of processing machines to access corresponding portions of the datastream and effect concurrent processing of the respective portions of the datastream.

2. The system of claim 1 wherein the access points are programmed to access any portion within the datastream window.

3. The system of claim 1, wherein the processing is selected from the group consisting of synchronization, analysis, field extraction, data manipulation, output stream construction and combinations thereof.

4. The system of claim 1 wherein multiple datastreams are processed by common shared logic, a datastream context fetched from a storage mechanism during a processing period and stored to the storage mechanism upon completion of the processing period.

5. The system of claim 4 wherein the processing is selected from the group consisting of synchronization, analysis, field extraction, data manipulation, output stream construction and combinations thereof.

6. The system of claim 1 wherein the means for receiving one or more datastreams comprises a communication processing engine and the means for shifting a datastream through a datastream window comprises a shift register.

7. A system comprising:
a plurality of concatenated data processing systems, each data processing system implemented within an integrated circuit, and including:
means for receiving and transmitting one or more datastreams;

means for buffering the one or more datastreams, the buffering effected at an atomic level as small as one bit at a physical wire level of the integrated circuit;

means for scheduling processing of the data upon configured criteria being met; and means for shifting a datastream through a datastream window, the means for shifting comprising an integrated circuit hardware shifting mechanism, the datastream window containing data of multiple protocols, the datastream window having multiple access points that allow a plurality of processing machines to access corresponding portions of the datastream, each of the plurality of processing machines concurrently processing the corresponding portion of the datastream.

8. The system of claim 7 wherein multiple datastreams are processed by common shared logic, a datastream context fetched from a storage mechanism during a processing period and stored to the storage mechanism upon completion of the processing period.

9. The system of claim 8 wherein the processing is selected from the group consisting of synchronization, analysis, field extraction, data manipulation, output stream construction and combinations thereof.

10. A method comprising:

receiving a portion of a datastream to a stream buffer, the portion of the datastream containing data associated with a first channel of a plurality of channels, the data buffered at an atomic level as small as one bit at an integrated circuit physical wire level;

retrieving the datastream context of the first channel associated with the received portion of the datastream; and upon configured criteria being met, processing data from the first channel using the retrieved context, the processing effected using one of a plurality of processing machines; and concurrently processing data from one or more other channels of the plurality of channels, wherein the stream buffer, plurality of channels, and the plurality of processing machines are implemented within an integrated circuit.

11. The method of claim 10 wherein the context is switched upon receiving a subsequent portion of the data stream.

12. The method of claim 11 wherein the data to be processed comprises a specified number of events accumulated in a channel buffer.

13. The method of claim 12 wherein the specified number of events is based upon memory resources.

14. The method of claim 10 wherein each of the plurality of channels implements a protocol of a plurality of protocols.

15. The method of claim 14 wherein the plurality of protocols include protocols selected from the group consisting of T1, E1, J1, T3, E3, SONET, SDH, Ethernet, GFP, HDLC, PPP, Frame Relay, ATM, MLPPP, MLFR, MPLS, PWE3, IP, POS, EOS, Fiber Channel, Token Ring, FDDI, SCSI, SAS, iSCSI, TCP, UDP, FICON, and DSL.

* * * * *